(No Model.) 4 Sheets—Sheet 1.
W. M. SCHLESINGER.
TRAP FOR ELECTRIC RAILWAY CONDUITS.
No. 381,585. Patented Apr. 24, 1888.
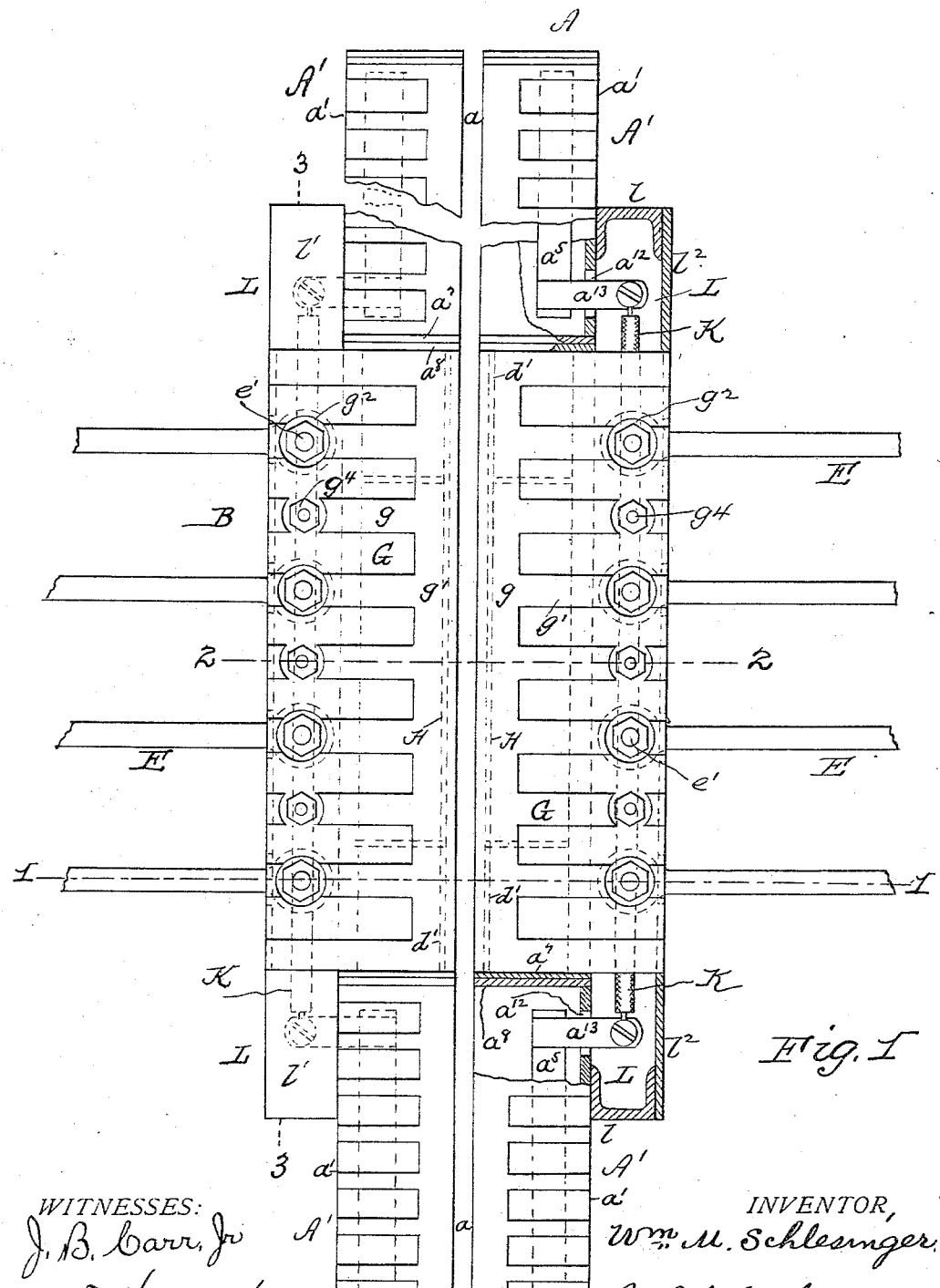
Fig. I.
WITNESSES:
J. B. Carr, Jr.
M. J. Halleck.
INVENTOR,
Wm. M. Schlesinger.
By S. J. VanStavoren,
ATTORNEY.

(No Model.) 4 Sheets—Sheet 2.
W. M. SCHLESINGER.
TRAP FOR ELECTRIC RAILWAY CONDUITS.
No. 381,585. Patented Apr. 24, 1888.
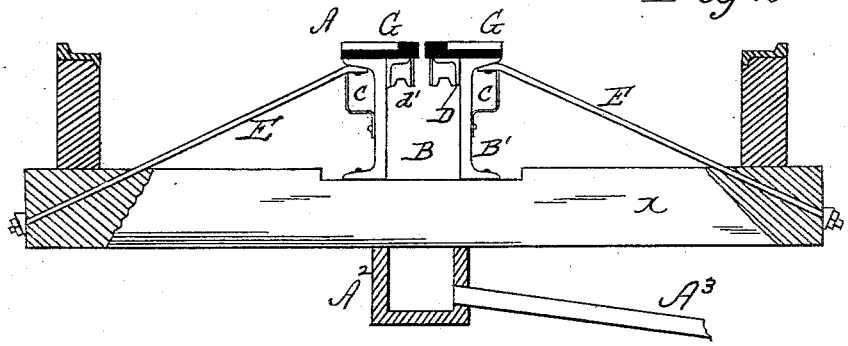
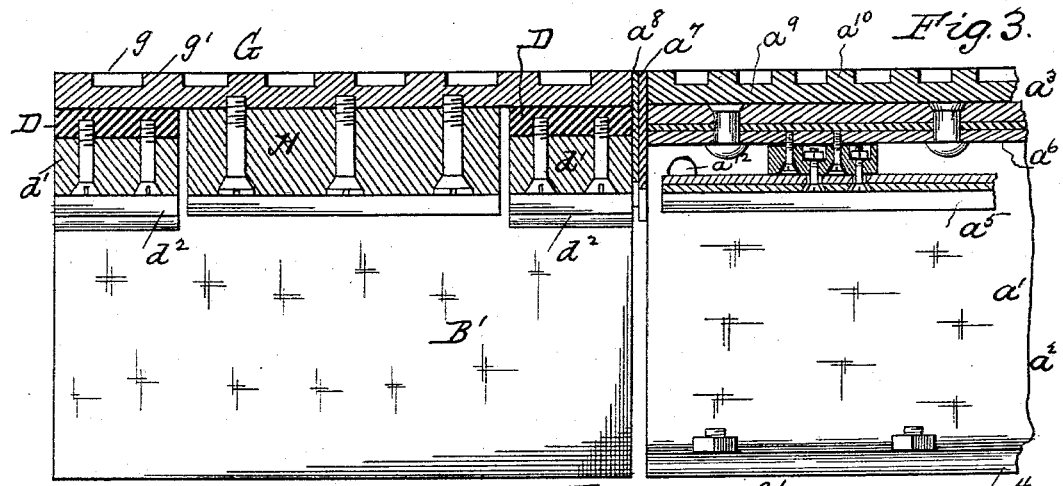
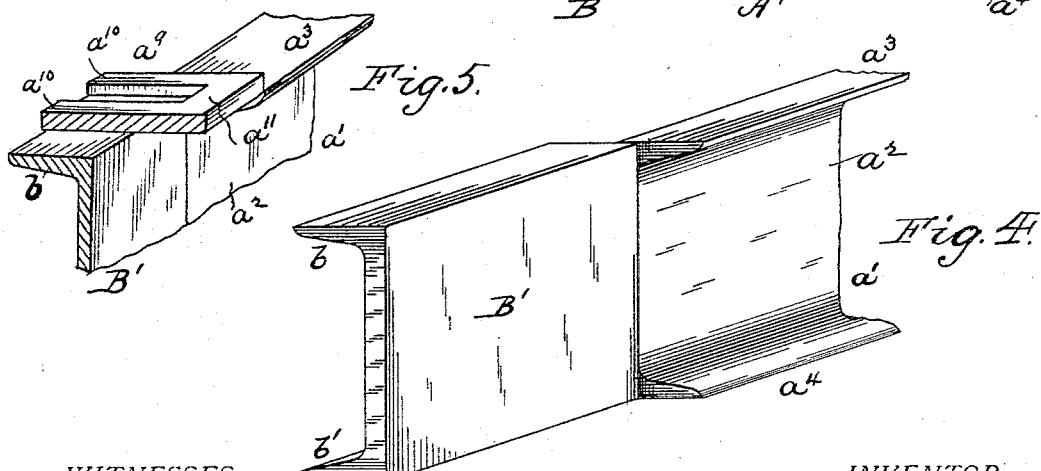
WITNESSES:
J. B. Carr, Jr.
M. F. Hallich.
INVENTOR,
Wm. M. Schlesinger
By S. J. Van Stavoren,
ATTORNEY.

(No Model.) 4 Sheets—Sheet 3.
W. M. SCHLESINGER.
TRAP FOR ELECTRIC RAILWAY CONDUITS.
No. 381,585. Patented Apr. 24, 1888.

WITNESSES:
J. B. Carr, Jr.
M. F. Halleck.

INVENTOR,
Wm. M. Schlesinger,
By S. J. Van Stavoren,
ATTORNEY.

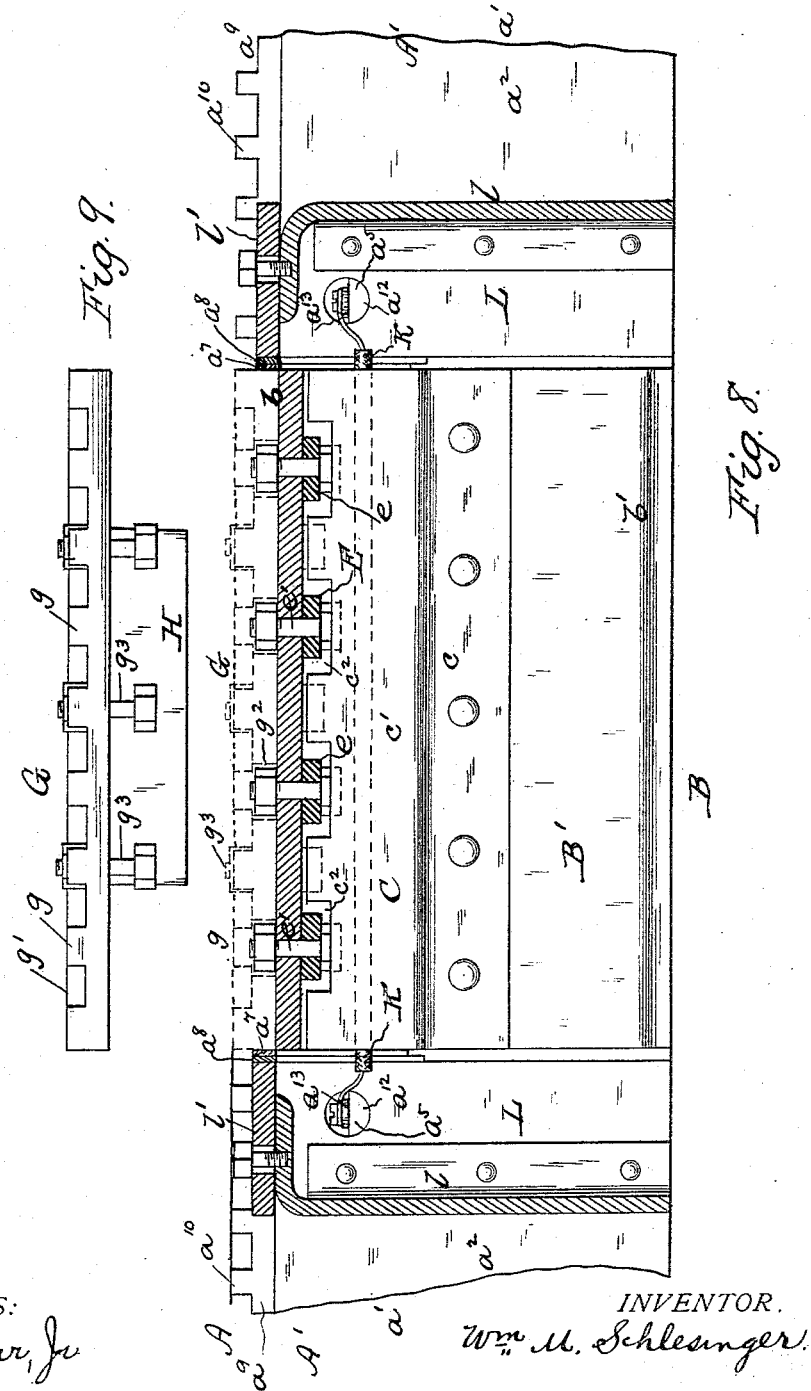

UNITED STATES PATENT OFFICE.

WILLIAM M. SCHLESINGER, OF PHILADELPHIA, PENNSYLVANIA.

TRAP FOR ELECTRIC-RAILWAY CONDUITS.

SPECIFICATION forming part of Letters Patent No. 381,585, dated April 24, 1888.

Application filed May 29, 1886. Serial No. 203,655. (No model.)

*To all whom it may concern:*

Be it known that I, WILLIAM M. SCHLESINGER, a subject of the Queen of Great Britain, residing at Philadelphia, in the county of Philadelphia and State of Pennsylvania, have invented certain new and useful Improvements in Traps for Slotted Conduits for Electric Railways, of which the following is a specification, reference being had therein to the accompanying drawings, wherein—

Figure 6:
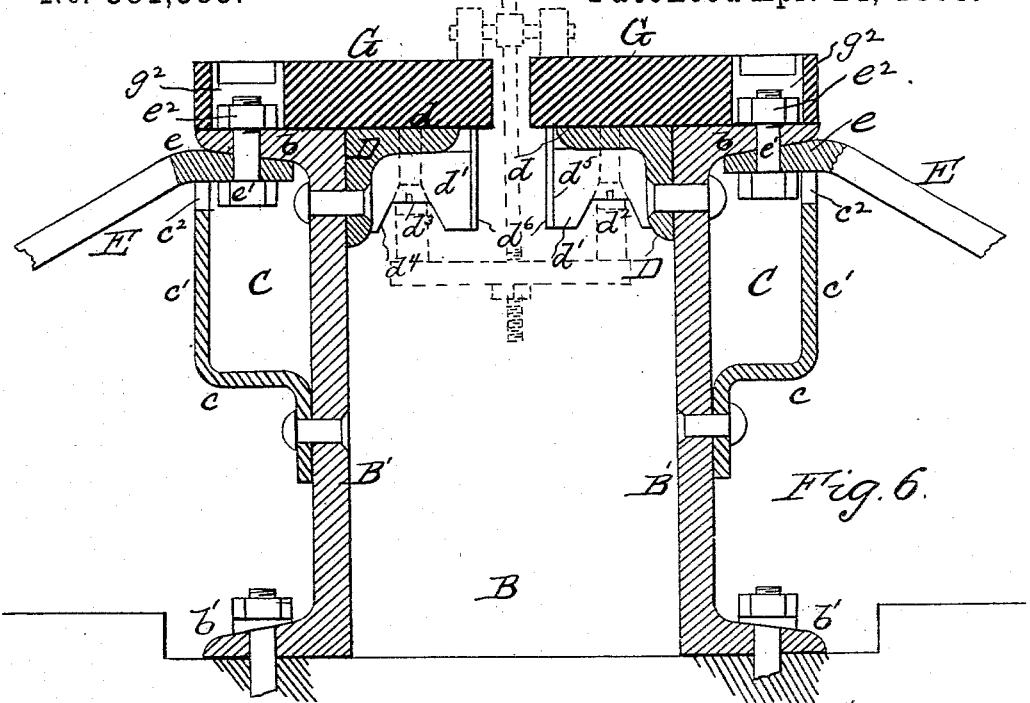
Figure 7:
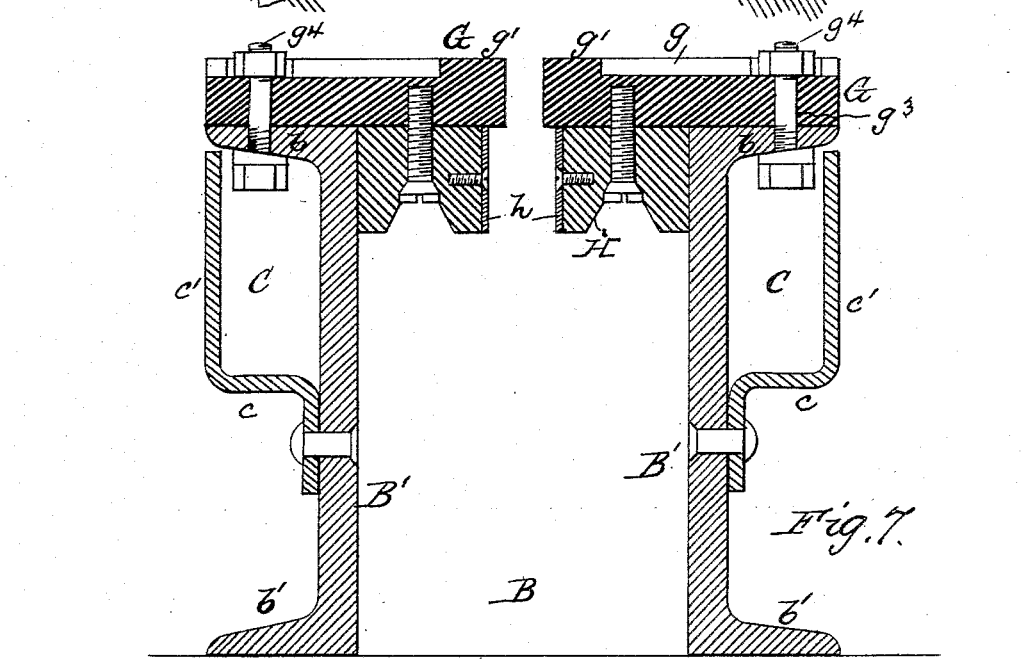

Figure 1 is a plan, partly sectional, of a portion of a line of conduit and a trap therein for electric railways embodying my improvements. Fig. 2 is a crosss-section of my improvements shown in connection with a street-railway. Fig. 3 is a longitudinal section of trap and part of conduit drawn to an enlarged scale. Fig. 4 is a perspective view of side beams or bars for trap and conduit, showing same form of beam in reversed positions for said fixtures. Fig. 5 is a perspective of part of same and part of top plate therefor. Fig. 6 is a section on line 1 1, Fig. 1. Fig. 7 is a section on line 2 2, Fig. 1. Fig. 8 is a longitudinal section through the top plate or flange of one side of the trap and through outside end boxes of the conduit sections, or on line 3 3, Fig. 1, showing cover for the trap in dotted lines; and Fig. 9 is a side elevation of said cover.

My invention has relation to slotted conduits for electric-railway conductors, particularly to the traps located along the line of the conduit through which the contact-plow traveling with the car is inserted into and withdrawn from the conduit, and it has for its object to provide a form of trap for a conduit through which the contact-plow can be placed in and taken from the conduit in an expeditious manner, and without interfering with or breaking the continuity of the electrical conductors, and the construction of details for securing this result and for providing an economical, easily made, and readily accessible trap for a slotted conduit.

My invention accordingly consists of the combination, construction, and arrangement of parts, as hereinafter described and claimed, having reference particularly to a slotted conduit having at suitable points or locations a trap or man-hole in the line of the conduit into which the electrical conductors do not enter, but are passed around the outside of the trap or through separate chambers located on each side of the trap and exterior thereto, whereby a clear or free space or opening in the trap is provided for insertion and withdrawal of the traveling or contact plow, and the circuit of the conductors is not broken when such insertion and withdrawal is made or when the trap-cover is removed; to a slotted conduit provided with a trap having electrical non-conductor strips for guiding the contact-brushes of the plow through the trap, and chambers on the outer sides of the trap through which pass the electrical conductors; to a slotted conduit-trap cover or covers having a portion of the non-conductor or guide-strips attached thereto, the remaining part of the guide-strips being secured to the conduit or trap sections or sides; to a slotted conduit-trap having a removable cover or covers, and side chambers arranged parallel with the length of the trap for passage of electrical conductors; to a slotted conduit-trap composed of side beams or bars having on one side top and bottom flanges, which beams are placed parallel with their flanges turned outward; to a trap so made combined with a conduit composed of side beams having top and bottom flanges, which beams are placed parallel with their flanges turned inward or approaching one another.

In the drawings, A represents a line of conduit which is slotted, as shown at $a$, the latter being preferably in the middle of conduit. The conduit is preferably composed of separate sections A', each section having separate sides $a'$, (see Figs. 3 and 4,) made of beams or bars $a^2$, having on one side top and bottom flanges, $a^3$ and $a^4$, respectively, and the beams are laid with the flanges approaching each other to form slot $a$ between them, and having the electrical conductors $a^5$ suitably secured to the flanges $a^3$ or to an angle-iron, $a^6$, riveted thereto to allow the conductors to expand and contract independently of the beams or bars, as fully set forth in an application filed by me of an even date herewith and Serial No. 203,654, said sections A also having the end plates of rubber, $a^7$, and metal, $a^8$, and top plates, $a^9$, corrugated transversely or having ribs $a^{10}$ extending part way across the top plates to leave a smooth top surface or rib, $a^{11}$, (see Fig. 5,) for the trolley to travel on; and the conduit has a sub-conduit, $A^2$, with lateral branches $A^3$ for escape of water.

The traps B are located at suitable points or intervals along the line of way of the conduit-sections and align therewith, as shown. Each trap is preferably composed of two side beams or bars, B', of a form similar to that of the beams or sides of the conduit-sections—that is to say, the traps have side beams or bars, B', which have on one side top and bottom flanges, $b$ and $b'$, respectively; but these bars are laid with their flanges $b$ and $b'$ turned outward or away from one another, whereas the conduit section bars or beams are laid with the flanges approaching each other. The trap side beams or bars are so laid in order to utilize the form of side bars shown, which is a standard make of beam for use in the mechanical arts, and to avoid the expense of making specially-formed side beams; also, to secure effective bracing for the side beams and provide tops or covers for outside longitudinal chambers, C, as hereinafter set forth.

To the upper part of the inner side, $b$, of each beam B' and at both ends flush with its top edge or that of the flange $b$ is riveted a short length of angle-iron, D, as more plainly shown in Figs. 3 and 6. The upper sides, $d$, of these irons partly form a top or cover for the beams at their ends or approach each other to form the slot. Upon the outside of the beams B and longitudinally therewith are riveted angle-bars or bent strips $c$ to form chambers C. The sides $c'$ of bars or strips $c$ extend up to the flanges $b$ of the beams B', and have recesses $c^2$ in their top edges at intervals for the passage of the ends $e$ of braces E, which connect the beams B' with the cross-ties $x$, as shown more plainly in Fig. 2. The ends $e$ of the braces are bolted, as shown at $e'$, to the lower side of the flanges $b$, the bolts passing up through and projecting above the flanges, as shown at $e^2$, if desired. The chambers C extend, preferably, from end to end of the beams, as illustrated more plainly in Fig. 8, for a purpose hereinafter described.

To the short angle-bars D are suitably screwed or secured blocks of wood or other suitable electric non-conductor, $d'$, having a bottom or contact-surface, $d^2$, corresponding in outline to that of the conductors $a^5$, and is shown grooved, having a flat top, $d^3$, and diverging sides $d^4$. These blocks $d'$ are on their vertical sides $d^5$ provided with a metal strip or facing, $d^6$, to protect them from the plow or contact-shank traveling in the slot $a$ and against moisture or rain entering the slot. The blocks $d'$ are attached to the sides of the trap to always keep them in a fixed position in line with the conductors for guiding the contact-points of the plow to the conductors after the plow is inserted into the trap.

The trap cover or top is divided into sections or composed of two plates, G G, with intervening slot, resting upon the top of the beams, their angle-irons D, and flanges $b$. These plates are corrugated or ribbed transversely, as indicated at $g$; but preferably these ribs only extend part way across the plates to leave a smooth longitudinal rib or upper surface, $g'$, adjacent to the slot $a$, for the trolley to run upon, the same as described for the top plates of the conduit-sections. The top plates G are provided with openings $g^2$ for reception of the projecting ends or nuts of bolts $e'$, and through which said nuts are tightened or loosened from time to time without removing covers or plates G, and the latter are provided with other openings, $g^3$, through which pass bolts $g^4$ for securing the plates to the flanges $b$ of beams B'. (See more plainly Fig. 7.) These bolts $g^4$ screw into the flanges, and are provided at their upper ends with screw-nuts, which firmly hold the plates in position, and by removing which the plates are free to be raised. To the plates G are secured wooden or other electric non-conductor blocks, H, of a form similar to blocks $d'$, secured to angle-bars D. These blocks H fill up the space in the trap between blocks $d'$ and are in line with each other. The blocks H are secured to the plates G to admit of both plates and blocks being removed from the trap when the plates are detached for insertion of the contact-plow into and its withdrawal from the conduit. Blocks H have metal facings $h$ for protection, the same as described for blocks $d'$.

Near the ends of the conduit-section beams $a^2$ are located the side openings, $a^{12}$, through which the ends $a^{13}$ of the conductors lead, as indicated in Figs. 1 and 8, and fully described in said pending application, and these ends $a^{13}$ are coupled by wires or other conductors, K, which pass through the chambers C of the trap B.

To protect the ends $a^{13}$ the conduit-sections have at their outside ends, in line with chamber C, an end chamber, L, made, preferably, of a vertical angle-bar, $l$, riveted to the beams $a^2$, a removable top plate, $l'$, and face or side plate, $l^2$; but they may be otherwise constructed, as desired. The conductors $a^5$, therefore, do not pass through the trap, but outside of it, through the chambers C and L, by means of which said parts of the conductors are protected against the weather. The contact-plow can therefore be inserted into and withdrawn from the conduit without breaking or interrupting the line-circuit.

The contacts on the plow are guided through the traps, and as these are only of a short length the velocity of a traveling car carries the plow through the trap almost instantly, and its speed is not materially diminished.

In using a trap having in it guides for the plow-contacts and outside or separate chambers for the electric conductors, I do not confine myself to any particular form of guides in cross-section nor to their location, as they may be variously placed, according to the different systems in which they are used; neither do I limit myself to the construction and arrangement of the outside or separate chambers for the electric conductors, as these chambers will be made and located to suit different systems of electric railways. So, too, if desired, the guide-blocks H may be dispensed with; but I prefer to use them to prevent injury to the contacts as they pass through the trap from blocks d' to d'.

A slotted conduit provided with traps, constructed as described, has no electric conductors within the traps. Consequently the trap-covers can be removed at any time for insertion and withdrawal of the contact-plow without breaking the circuit of the electrical conductors. The traps are, however, provided with non-conducting blocks in line with the conductors for guiding the contact-plow through the traps, and as these blocks are composed of two parts—one secured to the trap-cover and the other to the sides of the trap—the last-named block parts are always in a fixed position for directing the contact-points of the plow to the electric conductors after the plow is inserted into the trap, and as the block parts attached to the trap covers are removable from the trap along with the covers, a clear or open space in the traps is provided for the insertion of the contact-plow.

The above-described form of trap and arrangement of conductors avoids the use of spring-fingers or other devices heretofore used in the traps for maintaining continuity of the circuit of the electrical conductors when the trap-covers having a part of the conductors attached thereto are removed from the trap.

The within-described trap for the conduit differs from that shown and described in my aforesaid pending application, Serial No. 203,654, in that the traps or boxes in the last-named case are outside of and virtually form no part of the main conduit proper, and they are so arranged or located as to admit of leading the conductors outside of the conduit-sections at their ends to permit coupling the ends of the conductor sections together and to obtain access to said couplings without having to open the conduit and without interfering with the travel, and also to permit of or compensate for the expansion and contraction of the conductors and conduit-sections. These traps or boxes, therefore, are not in any way analogous to the traps shown and described in the present application, in which the traps are located in the line of or form part of the conduit, and have removable covers to admit of inserting the traveling current-collector or plow for the car into and withdrawing the same from the conduit, when desired. In effecting this insertion and withdrawal it is preferable to have, first, the trap so arranged that the removal of its cover will not break the continuity of the circuit of the conduit-conductors, as it is essential to maintain all parts of the line in continuous working condition; second, to prevent contact of the traveling current-collector or plow with the conduit-conductors while a current-collector or plow for a car is manipulated or adjusted within the trap, in order to insure safety of the workman while adjusting the current-collector or plow, and, third, to provide for guiding the contact-points of the current collector or plow for each car to the conduit-conductors when the car is put into motion, and also when said contacts are passing through a trap as the car travels along. As the conductors do not pass through but are outside of the traps, the continuity of the circuit of the conductors is always maintained and is not broken when one or more than one trap-cover is removed. As the insulated blocks d', in line with the conductors, are located within the traps, the current-collector or plow contacts are adjusted to said blocks without danger of contacting with the conductors, and these blocks guide the plow-contacts to the conductors when the car is started. As the trap-cover has insulated blocks H in line with blocks d' and the conductors, the current-collector or plow contacts are thereby guided through the trap as the car moves along, and these contacts cannot strike against the ends of the conductors; hence all danger of breaking, bending, or otherwise impairing the durability of said contacts is avoided.

In starting a car it is manually pushed or drawn by horse power across or along the trap until its traveling current-collector or plow contacts meet the conductors, and as the cars travel along their momentum carries them and their traveling current-collectors or plows past or through each successive trap, or, when the cars are stationary over a trap, previous to starting their plows or current-collectors may themselves be slid along until contact is made with the conductors.

What I claim is—

1. In an electric railway, the combination of a slotted conduit having at intervals along its length removable man-hole or trap covers, a line of parallel conductors having intervals or spaces adjacent to said covers, insulating or non-conducting guide-blocks secured to said covers in line with and having a cross-section corresponding to that of the conductors to fill up the spaces or intervals therein, electrical couplings at or around said spaces for completing the continuity of the conductors, and an electrically-propelled car having a current-collector for contact with said conductors and guide-blocks, whereby the circuit of the conductors is not interrupted when the collector travels in contact with said guide-blocks, nor when the latter are removed for withdrawing the collector from or inserting it into the conduit, substantially as set forth.

2. The combination of a slotted conduit, a trap in the line of and forming part of the conduit, having guide-blocks d' and H, and provided with chambers C, exterior to the trap, and a line of conductors secured within the conduit in line with blocks H and having electrical couplings or bridges passing through chambers C, substantially as set forth.

3. The combination of a slotted conduit, a trap in the line of and forming part of the conduit, chambers C outside of the trap, removable cap or cover for the trap and chambers C, a line of electrical conductors secured within the conduit and passing through chambers C, and guide-blocks of electric non-conducting material within the trap in line with said conductors, substantially as set forth.

4. In an electric railway, a conduit having electrical conductors, a trap in the line of the conduit and having outside chambers, C, through which the conductors pass, a removable cover, and electric non-conducting guide-blocks in the trap in line with the conductors, substantially as set forth.

5. In an electric railway, a conduit having electrical conductors, a trap in the line of the conduit, having guide blocks $d'$ in line of the conductors, removable cover for the trap, having guide-blocks H in line with blocks $d'$, and chambers C, exterior to said trap and through which the conductors pass, substantially as set forth.

6. In an electric railway, the combination of a slotted conduit having a trap in the line of the conduit provided with outside chambers, C, a line of conductors secured within the conduit and broken away at the trap, so as not to enter the same, electric couplings or bridges passing through chambers C for connecting the conductors around the trap, and a traveling current-collector for contact with said conductors, substantially as set forth.

7. In combination with slotted conduit-sections having electric conductors passing laterally out of said sections at their ends, a trap in the line of and between said sections and having electric non-conducting guide-blocks H, and outside chambers, C, in which are located electrical connections for coupling the lateral ends of said conductors, substantially as set forth.

8. The combination of separate slotted conduit-sections, each composed of separate sides or beams, each having separate electrical-conductor sections, a trap in line with and between said conduit-sections and having blocks $d'$, chambers C outside of the trap, through which the conductor-sections are coupled, and a removable cover for said trap, having blocks H aligning with block $d'$, substantially as set forth.

9. The combination, with a slotted conduit, of electrical conductors having at intervals along their length insulation or non-conducting blocks, couplings for leading the conductors around said insulation or blocks, and metal facing for said insulation or blocks, substantially as and for the purpose set forth.

10. In combination with a slotted conduit and its electrical conductors, a trap in the line of and forming part of the conduit, and the non-conducting blocks $d'$ and H, having separate facings or plates $d^6$ and $h$, substantially as set forth.

11. In a trap for conduits for electrical conductors, having bottom contact surfaces, guide-blocks of non-conducting material in line with the conductors, and couplings for leading the conductors around said blocks, substantially as set forth.

12. In combination with conduits for electric conductors for electric railways, a trap in line with the conductors, having removable cover provided with electric non-conducting blocks H, in line with the conductors, and electric couplings for leading the conductors around said blocks, substantially as and for the purpose set forth.

13. In combination with a slotted conduit having electrical conductors, the trap sides or beams B', having top flange, $b$, braces E, bolted to said flange, and trap-cover G, having openings $g^2$, substantially as set forth.

14. In an electric railway, a slotted conduit composed of sections, each section composed of side bars or beams having top flanges approaching each other, and a trap in line with said sections, composed of side beams or bars having top flanges on the outside of the beams or arranged reversely to those of the conduit-sections, substantially as set forth.

15. The combination, with a slotted conduit, of a trap located in the line of the conduit and having electric non-conducting guide-blocks H, said conduit being composed of separate side beams or bars having outside chambers, C, braces E, and removable covers G, substantially as and for the purpose set forth.

In testimony whereof I affix my signature in presence of two witnesses.

WILLIAM M. SCHLESINGER.

Witnesses:
 JOHN RODGERS,
 S. J. VAN STAVOREN.